United States Patent [19]

MacKay

[11] Patent Number: 5,450,371
[45] Date of Patent: Sep. 12, 1995

[54] STATISTICAL ANALYSIS OF REGIONAL VELOCITIES

[75] Inventor: Scott W. MacKay, Englewood, Colo.

[73] Assignee: Western Atlas International, Houston, Tex.

[21] Appl. No.: 79,012

[22] Filed: Jun. 18, 1993

[51] Int. Cl.⁶ ...................... G01V 1/30; G06F 15/347
[52] U.S. Cl. ...................................... 367/63; 367/27; 367/32; 367/68; 364/421
[58] Field of Search ................... 367/27, 32, 63, 68; 364/421

[56] References Cited

U.S. PATENT DOCUMENTS

| | | | |
|---|---|---|---|
| 4,926,394 | 5/1990 | Doyen | 367/73 |
| 4,947,120 | 8/1990 | Frank | 324/309 |
| 5,097,452 | 3/1992 | Beasley | 367/53 |
| 5,265,016 | 11/1993 | Hanson et al. | 364/422 |

FOREIGN PATENT DOCUMENTS 629884 12/1994 European Pat. Off.

OTHER PUBLICATIONS

Dingman et al, Water Resources Research, vol. 25, #3, 1989, pp. 509–518; abstract only provided herewith.
Knox, W. A., Regional Velocity Gradient from Normal Moveout, Geophysics, v. 29, No. 6, Dec. 1964.

Primary Examiner—Nelson Moskowitz
Attorney, Agent, or Firm—William A. Knox

[57] ABSTRACT

A multi-dimensional assemblage of time/velocity functions are sampled for velocity as a function of incremental time. The samples are stored in a matrix arranged in columns along the time axis and rows across the velocity axis. The count of the number of samples resident in the respective cells of each row is indexed. A desired statistical operator is applied to the count indices in the rows to provide a family of filtered histograms in time-sequential order. The filtered histograms may be edited by delimiting acceptable velocities to lie between preselected percentiles.

7 Claims, 4 Drawing Sheets

STATISTICAL ANALYSIS OF REGIONAL VELOCITIES

BACKGROUND OF THE INVENTION

1. Field of the Invention

This invention is concerned with a method for statistically studying and editing seismic velocities, such as are used for stacking and migration processes as applied in geophysical exploration of the subsurface of the earth. Of interest is a compact display of the regional velocity gradient.

2. Discussion of Related Art

Stacking and migration of raw seismic data requires a knowledge of the propagation velocity (hereinafter referred to simply as "velocity") of an acoustic wavefield through subsurface earth formations. Usually the velocity is calculated directly from the seismic data using as arguments, the square of the reflection travel time, t, and the square of the source-receiver offset, x, whereat that travel time was measured. Any one of a number of well-known algorithms may be used for the calculations.

Customarily velocity analyses are calculated at regular spatial intervals throughout the survey area often associated with selected CMP (common mid point) gathers. A typical velocity analysis may be presented as a time/velocity plot. The velocity data are estimated from the seismic reflection trajectories which are often contaminated with noise. A velocity analysis presentation may take the form of contours of trace-to-trace coherence or in the form of semblance peaks having an amplitude proportional the goodness of the inter-trace correlation. Because of noise-generated artifacts, most velocity analyses require a modest amount of interpretation before determining which semblance or coherence maxima will be used to construct the velocity function representative of the data.

The velocities determined in the manner described above usually vary vertically as an increasing function of depth (time) and they may vary spatially as a function of offset and azimuth. In a relatively confined, local area with minimal structural dip angles, a single depth-varying average velocity function suffices for the migration process. For an extended regional survey, in the presence of a significant lateral velocity gradient and steep formation dips, a three-dimensional, depth and spatially-varying velocity must be considered. That process requires very expensive, complex computer data processing.

Various approximate methods have been devised for economical data-migration in the presence of a significant lateral velocity gradient. One very successful technique makes use of a residual migration process. The basis of that technique involves migrating the data during a first pass using a constant minimal migration velocity. That step is followed by a second migration pass wherein a small residual migration is applied to the migrated seismic data from the first pass. The second-pass migration is calculated using; as an argument, the difference between the minimal migration velocity for the area and the local velocity existing at the grid position of the effective incident point of the data.

One such method is taught by U.S. patent application Ser. No. 07/739,140, now U.S. Pat. No. 5,233,569, issued Aug. 3, 1993 to C. Beasley et al. and assigned to the assignee of this invention, entitled MODIFIED RESIDUAL MIGRATION OF SEISMIC DATA, which is incorporated herein by reference with respect to the concept of residual migration velocities. Another relevant patent is U.S. Pat. No. 5,097,452, issued Mar. 13, 1992 to C. Beasley and assigned to the assignee of this invention, entitled ANALYSIS OF MIGRATION VELOCITY BY MIGRATION OF VELOCITY SPECTRA.

In the conduct of a large 2-D or 3-D geophysical survey, it is convenient to display a quantitative summary of the velocity gradient across an area of survey. The display would be constructed using statistical methods to filter out random velocity artifacts. One way would be to provide a contour map of some parameter that is a measure of the lateral velocity changes. One such method is disclosed in REGIONAL VELOCITY GRADIENT FROM NORMAL MOVE-OUTS, Geophysics, v. 29, n. 6, December, 1964. That method of display is disadvantaged in that it is only two-dimensional in lateral space. The spatial velocity gradient is shown but not the vertical distribution. A separate map must be provided to show the velocity-field characteristics at each depth level of interest. Accordingly, it is somewhat awkward and bulky for routine use where a large area and many depth levels are under study.

There is a need for the provision of a single compact two-dimensional collective display of the statistical distribution of the velocity field characteristics within an extended region including both the temporal and spatial axes of the velocity field and for a method for determining an areal minimal migration velocity function for use in the earlier-referenced residual migration processes.

SUMMARY OF THE INVENTION

In accordance with an aspect of this invention, the lower and upper limits of the velocity field within an area of interest are established. A distribution matrix, which may be rectangular, is formed having a plurality of virtual cells arranged in columns and rows, each cell having a vertical dimension corresponding to a time window of a predefined thickness and a horizontal dimension that is representative of a predefined velocity range. A plurality of time/velocity functions are assembled, derived from a plurality of velocity analyses from a corresponding plurality of preselected seismic stations within the survey area. For each of a plurality of preselected time windows, the corresponding velocity function from each of the respective seismic stations is sampled and each sample is inserted as a count-index increment into the cell, of a row of cells within the matrix, that corresponds to the appropriately-valued velocity range. Upon completion of final data entry, for each time window, a cumulative frequency distribution in velocity is formed from the final count index resident in each cell in the row. A portion of the cumulative frequency distribution at each time window is delimited between preselected lower and upper percentiles.

In another aspect of this invention, a histogram is formed for each row from the delimited cumulative frequency distribution counts resident in each cell. The histograms are filtered by an interpolation filter operator thereby to form a family of filtered, percentile-delimited histograms in velocity as a function of time.

In another aspect of this invention, a minimal regional migration velocity function is defined as that curve which smoothly osculates the envelope of the lower percentiles along the family of filtered histograms as a function of travel time.

A residual migration velocity is formed from a subsampling of the percentile-delimited portion of the family of filtered histograms in velocity.

The family of percentile-delimited histograms in velocity are displayed as a tangible representation of the regional velocity gradient.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
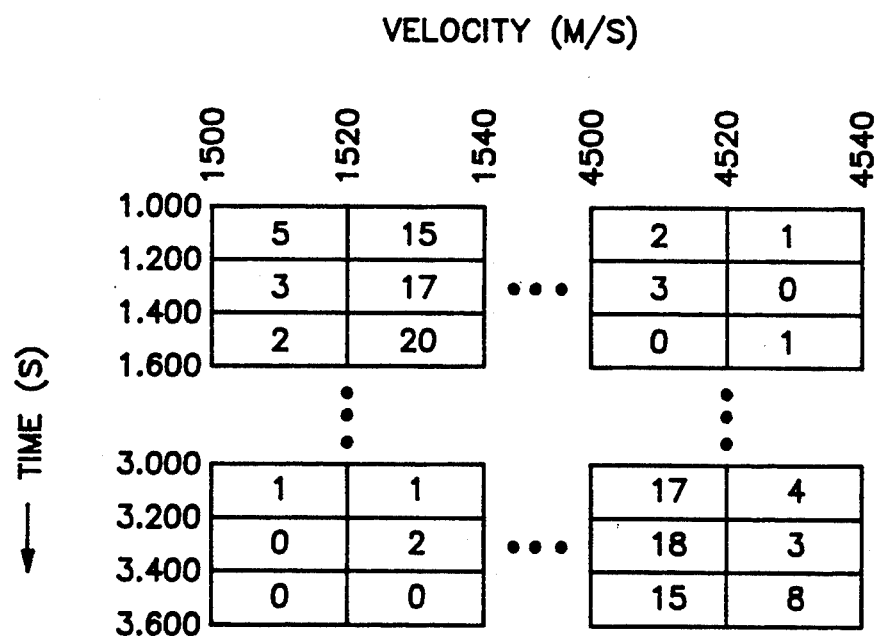
FIG. 1 is distribution matrix including an array of cells that have the dimensions of incremental time vertically and incremental velocity horizontally.

FIG. 1 represents a distribution matrix 8, preferably rectangular, for containing a plurality of sampled individual velocity functions derived from selected seismic stations within an area under survey. The matrix consists of a plurality of cells, sometimes referred to as bins, that are dimensioned vertically in time along columns and horizontally in velocity across rows. Conveniently, the matrix may be virtual block of cells in a computer or it may be formed on a storage means of any desired type. Vertically, each cell represents a time window of some predefined incremental time such as 0.200 second (s). Horizontally, each cell has a predefined width of, for example, 20 meters per second (m/s). Those numbers are exemplary and are in no way limiting. The number of cells in each row is a function of the total three-dimensional spread in velocity divided by the desired velocity range per cell. Similarly, the number of cells in each column is the maximum anticipated travel time divided by the thickness of the desired time window.

The contents of the distribution matrix 8 of FIG. 1 are derived from a plurality of individual velocity functions taken from seismic survey stations that preferably are distributed reasonably uniformly over the survey area. The velocities might result, for example, from velocity analyses of a number, such as 100, of CMP gathers. The final entry for each cell is a count of the number of occurrences of a particular velocity range as a function of a particular time window after all of the data have been entered.

Figure 2:
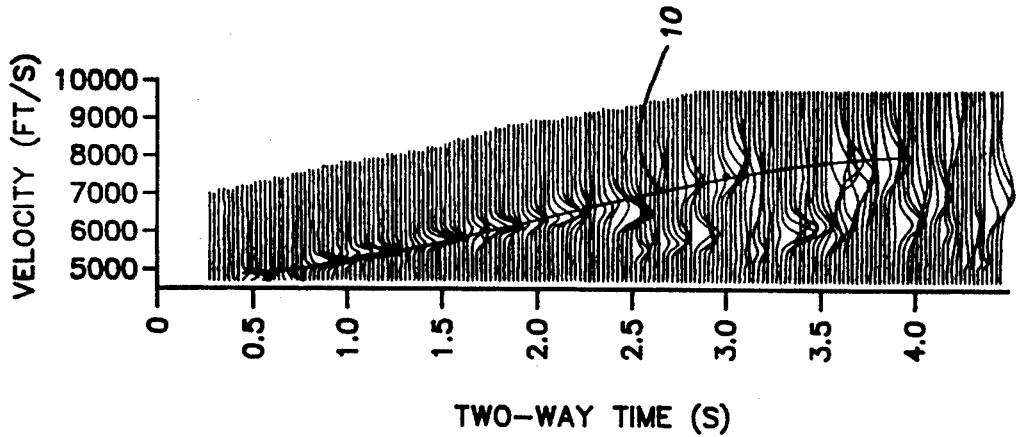
FIG. 2 is an example of a conventional velocity analysis for a single station.

FIG. 2 is an example of a conventional velocity analysis, in semblance format, from a selected gather showing velocity as a function of travel time. Over the entire time section, from the near surface to the deepest recorded travel time, the lower and upper velocity limits spans an interval from 5000 ft/s to about 8000 ft/s. Although there is a moderate velocity scatter at some of time levels, a smooth average velocity function such as curve 10 can be drawn through the loci of greatest density of the semblance maxima. The interpreter would ordinarily mentally edit obvious erratic semblance maxima when defining the time/velocity pairs of the representative function. For good and sufficient reasons, FIG. 2 is marked in feet per second rather than in meters per second as with the other Figures.

A velocity function, such as shown in FIG. 2, is divided into a plurality of time windows or intervals of predefined thickness such as 0.200 s as explained earlier. For each time window, the corresponding velocity function is sampled and the sample count is entered 5 in the appropriate cell whose range embraces the numerical value of the sample, the cell lying in the row corresponding to the aforesaid time window. This process is repeated for every velocity function of interest within the area of study.

Figure 3:
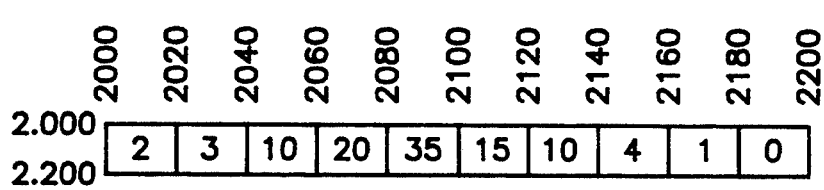
FIG. 3 is a the final index-count distribution of 100 samples that lie within ten velocity ranges between 2000 and 2200 m/s centered about a 0.200 s time window.

FIG. 3 shows the frequency-distribution entries for a single row, 9, at the 2.000–2.200 time level. It is assumed that 100 velocity functions contributed to the sample population after the final count and after all of the data entries were made. The count resident in each cell is the number of samples corresponding to that particular velocity range as taken from the respective velocity functions.

Figure 4:
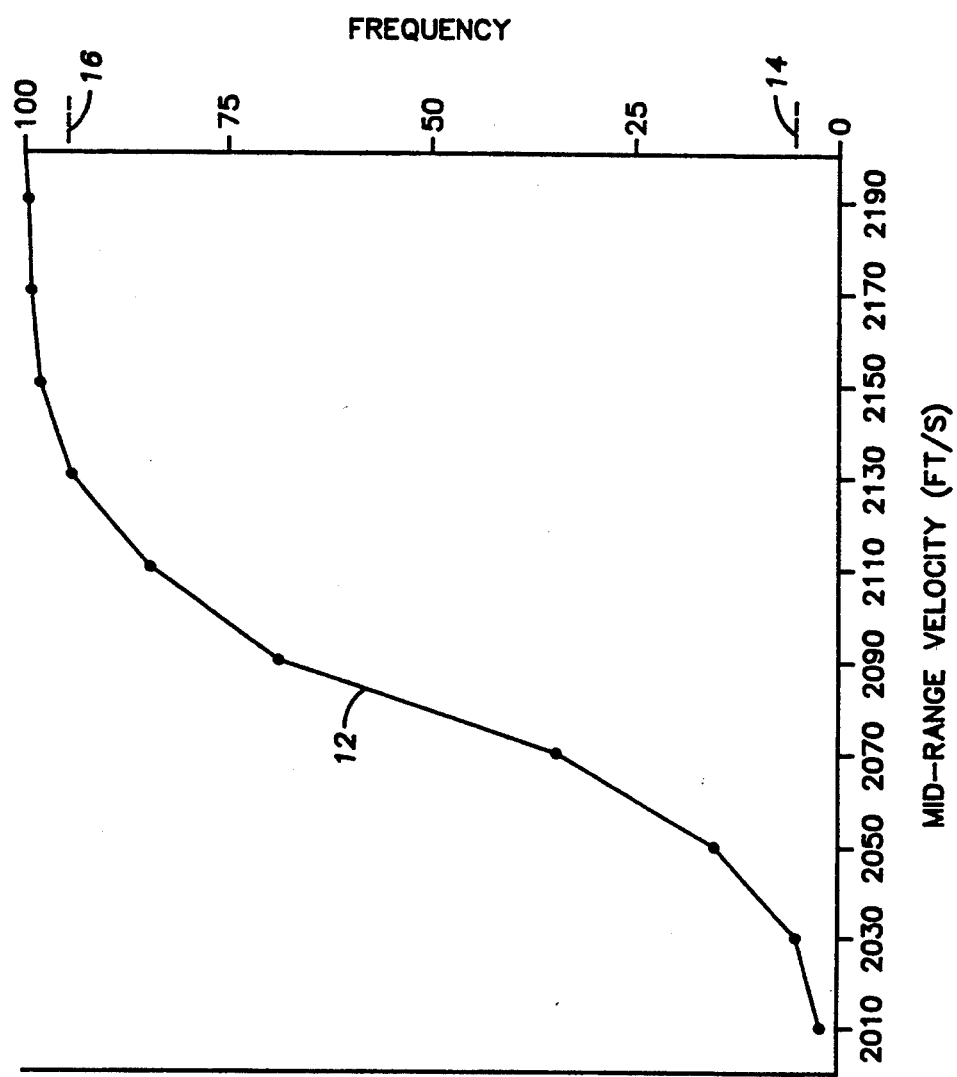
FIG. 4 is a cumulative frequency curve for the samples of FIG. 3, showing the 5 and 95 percentile cutoff limits.

FIG. 4 is a cumulative frequency distribution curve 12 for grouped data corresponding to FIG. 3. For purposes of this example but not by way of limitation, acceptable data may be defined to be confined between preselected percentiles such as, but not limited to, the 5 and 95 percentiles as shown at points 14 and 16 along the vertical axis of curve 12.

Figure 5:
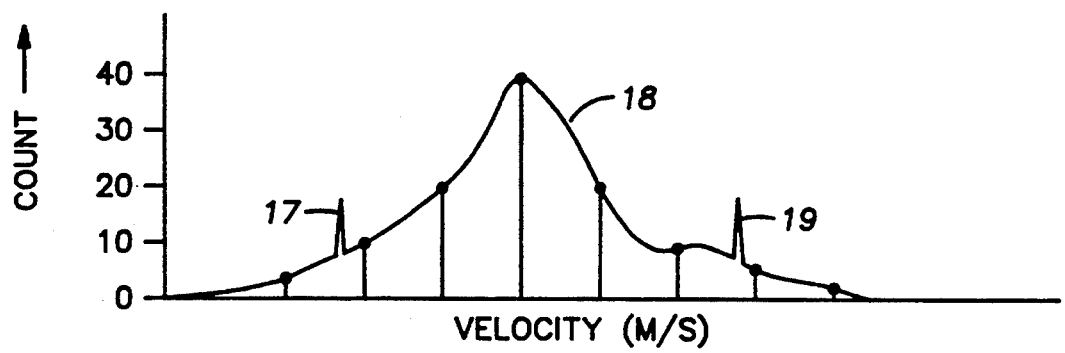
FIG. 5 is a filtered histogram in velocity of the number of grouped velocity samples within each velocity cell of FIG. 3 within the 2.000–2.200 s time window.

At each time window, a statistical operator such as a filtered velocity histogram 18, formed from the cumulative frequency distribution in velocity of FIG. 4, is prepared and plotted as shown in FIG. 5. The filtered histogram in velocity is created as follows: Assume that the histogram consists of a plurality of vertical, spaced-apart bars whose vertical height is proportional to the count of the number of samples per cell and whose spacing is proportional to the cellular velocity increment. The histogram can be filtered by application of a suitable interpolation operator of any desired type. The :tower and upper percentile limits are tangibly marked such as indicated by Dirac functions 17 and 19 respectively.

The data shown in FIG. 3–5 are exemplary of the processing for one row of cells in velocity centered about a particular time window in the time column. That process is repeated for all of the rows corresponding to all of the time windows included within the maximum travel time limits in the area under consideration. The result is a plurality of filtered histograms in velocity.

Figure 6:
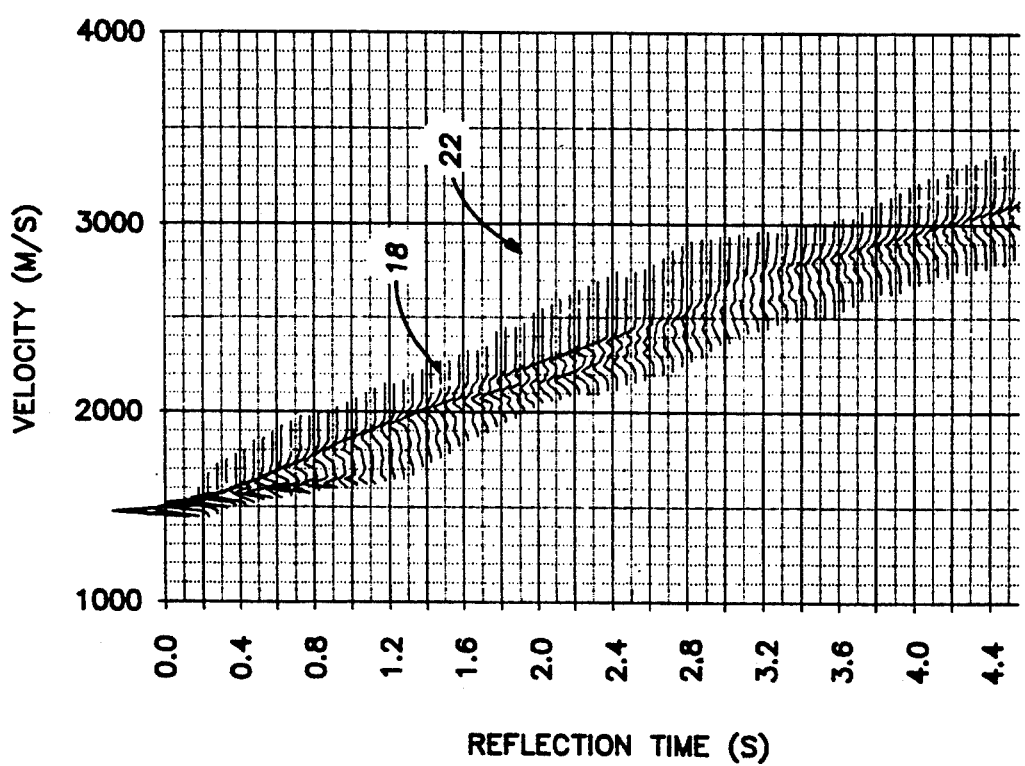
FIG. 6 shows a family of filtered velocity histograms plotted as a function of vertical travel time.

The plurality of filtered histograms in velocity for the corresponding time windows may assembled and tangibly displayed as a family 22 of histograms in time-sequential order such as a graph of travel time versus velocity as shown in FIG. 6. Alternatively, the histograms may be assembled as an array in a computer memory or on magnetic tape or on other storage media as desired. FIG. 6 is a compact two-dimensional display of the spatial velocity gradient versus vertical travel time, based upon a statistical study of the three-dimensional collective velocity functions that originated from a plurality of seismic stations spatially distributed over an area of survey.

Figure 7:
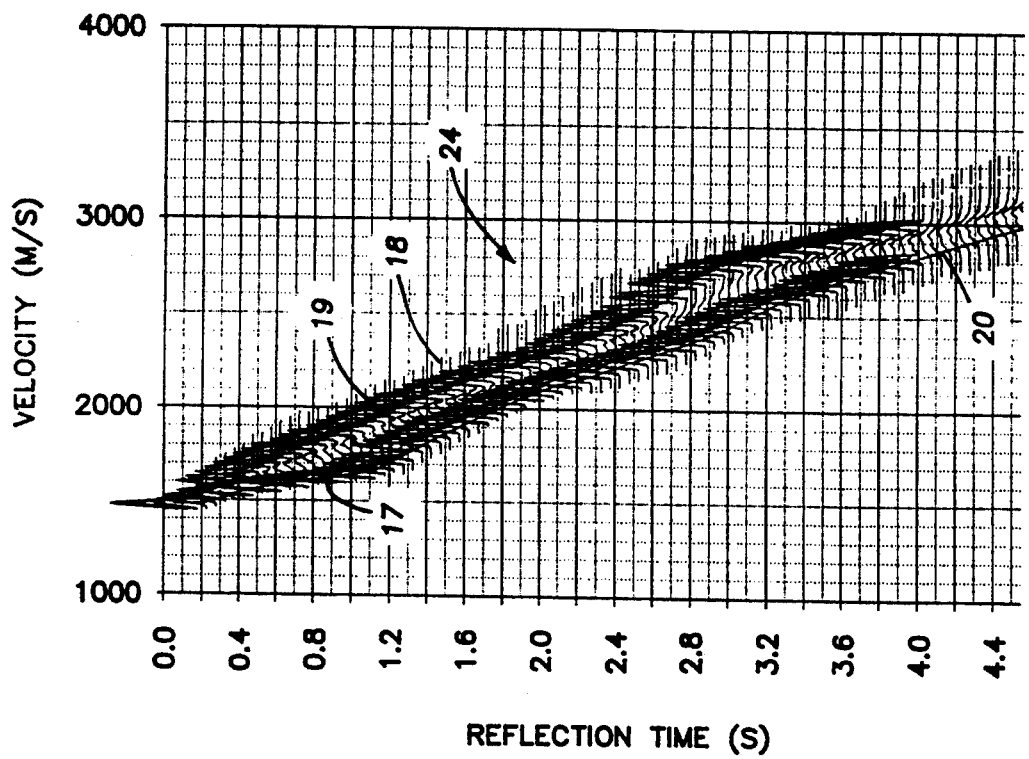
FIG. 7 is a display the data of FIG. 6, delimited by the 5 and 95 percentiles and illustrating the formation of the preferred minimal migration velocity function.

In FIG. 7, each member of the family 24 of filtered velocity histograms such as 18 has been delimited or edited by preselected lower and upper percentiles such as the exemplary 5 and 95 percentiles as earlier shown for FIG. 5, between spikes 17 and 19. Velocity functions that are confined within the desired percentile range may be sub-sampled and archivally stored to define a regional velocity field that is statistically representative of the area under study. A minimal migration velocity function for use in the region of interest is a smoothly-fitted time/velocity function 20 that is in osculating contact with the envelope comprising the respective lower 5-percentile limits such as 26 over the extent of the regional time-velocity function formed by the family 24 of filtered histograms in velocity. The desired time/velocity function could be formed for example, from a multi-point (such as a 7-point) running average of the lower-percentile delimiters.

A residual migration velocity function can be derived from a sub-sampling, at each time window, of a selected portion of the family of filtered histograms in velocity that lies between the percentile delimiters.

Figure 8:
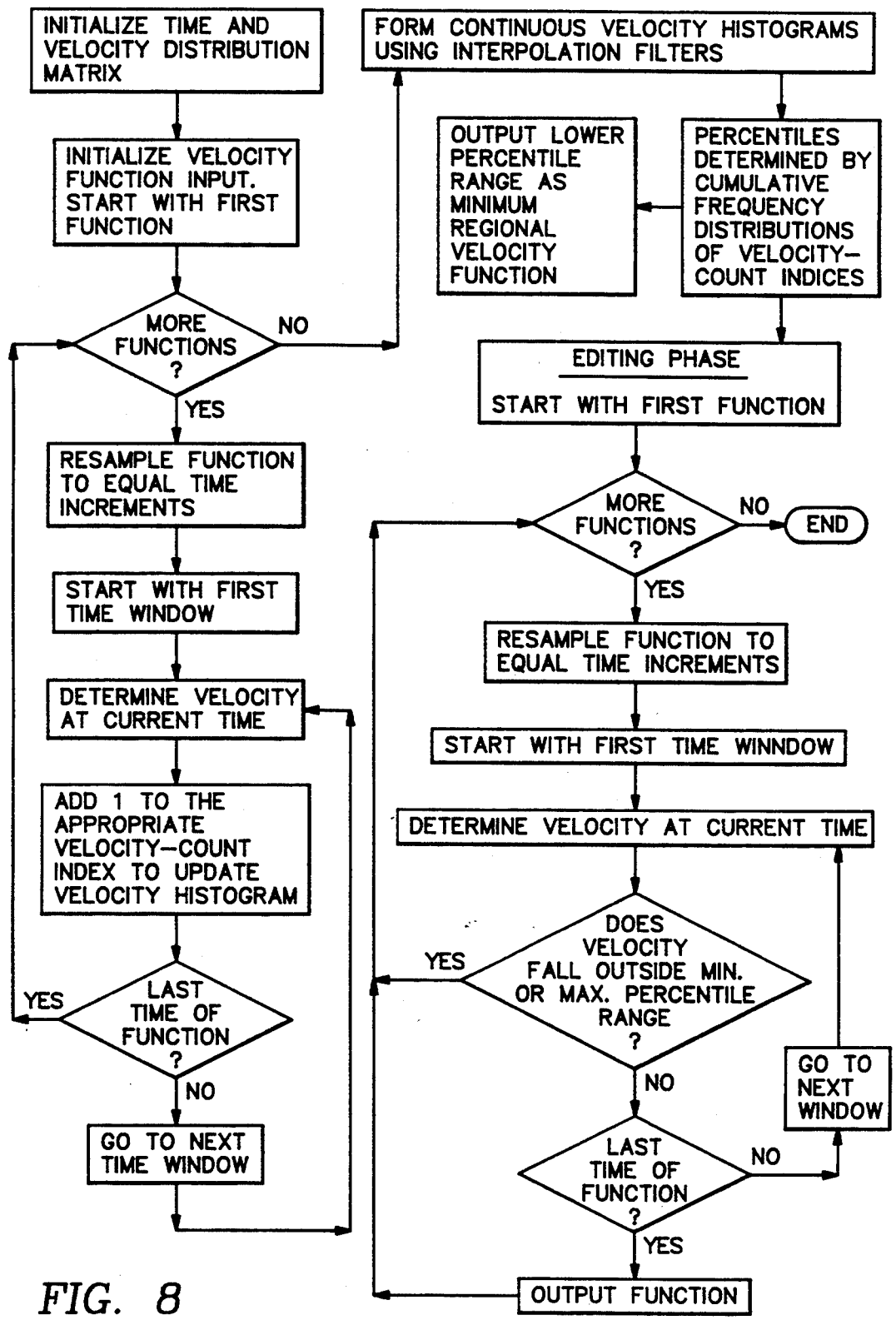
FIG. 8 is a flow diagram illustrating the principle steps needed to implement the method.

FIG. 8 is a generalized flow diagram useful in providing computer implementation of this method, something that is preferable since the number of data values to process from a typical 3-D survey may amount to many megaentries.

Initially, a preferably rectangular matrix is established such as in a computer memory. Referring to the left-hand series of processes in FIG. 8, the respective velocity functions derived from the survey operation are re-sampled for velocity at each of a desired plurality of time increments. The velocity samples are entered into matrix rows as previously described. After the velocity samples for all of the incremental times from all of the desired velocity function have been collected and stored, the statistics are computed, filtered and the desired percentile limits are established for each row of the matrix, corresponding to the respective time increments.

The right hand column defines the process of editing the statistics wherein values that reside between the preselected percentile limits are selected. Not shown is a step of amplitude-modulating the filtered histograms by applying a Dirac function at the count representing the pre-defined percentile limits. A minimal regional velocity function is defined by splining a curve that smoothly osculates the lower percentile limits for all incremental times. A tangible display of the results of the analysis optionally may be provided.

The velocity distributions within any given region are not necessarily Gaussian because of lithologic and structural complexity. In a geological domain that includes a gross local discontinuity such as an salt intrusion, it would be prudent to construct separate regional velocity displays.

This disclosure is exemplary only. Variations in the method of data analysis will be conceived by those skilled in the art but which nevertheless will fall within the scope and spirit of this invention which is limited only by the accompanying claims.

What is claimed is:

1. A method for defining the spatial velocity distribution characteristic of a volume of the earth, comprising:
   establishing a plurality of seismic stations over the surface of the earth in a region of interest;
   assembling a plurality of input time/velocity functions derived from a like plurality of velocity analyses originating from said plurality of seismic stations;
   sampling the velocity of each said time/velocity function of preselected time intervals;
   forming a distribution matrix comprising a plurality of cells arranged in columns and rows, the thickness of said cells being dimensioned vertically according to said preselected time interval, the widths of said cells being dimensioned horizontally in accordance with a predefined velocity range;
   storing each of the velocity samples in a cell as an incremental count index for a velocity range corresponding to each preselected sample-time interval;
   forming cumulative frequency distribution functions in velocity along rows of cells based on the respective resident incremental velocity-count indices;
   assembling a family of histograms in velocity, one for each row, from said cumulative frequency distribution functions;
   filtering said histograms between preselected upper and lower percentile limits; and
   producing a tangible display of the filtered histograms as a function of time to provide a physical representation of the velocity gradient across said region of interest.

2. The method as defined in claim 1, comprising:
   defining a minimal regional migration velocity by a time/velocity curve that smoothly osculates the envelope of the tangible lower percentiles of the family of filtered histograms.

3. The method as defined by claim 2, comprising:
   selecting a residual migration velocity from that portion of the family of filtered histograms that is confined between said preselected percentiles.

4. The method as defined by claim 1, comprising:
   defining a statistically-representative regional velocity field from sub samples of the input time/velocity functions that are confined between the preselected lower and upper percentiles; and
   archivally storing said sub-samples of said time/velocity functions.

5. A seismic data analysis for defining the spatial velocity distribution of a volume of the earth from a multi-dimensional assemblage of time/velocity functions, comprising:
   distributing an array of spaced-apart seismic stations over a selected region of survey;
   sampling the velocity of each said time/velocity function at preselected discrete time intervals at each one of the seismic stations within an array;
   forming a multi-cell sample-storage matrix arranged in columns and rows;
   storing velocity samples in said multi-cell sample storage matrix by rows as a function of velocity range and by columns as a function of said discrete time interval;

indexing a count of the number of samples resident in each said cell of each said row of cells;

filtering the cell counts in each one of the respective rows to provide a family of filtered histograms as a function of said discrete time intervals;

establishing desired upper and lower percentile limits for said histograms;

generating a physical two-dimensional display of said family of delimited filtered histograms to provide a source of migration velocities for use in processing seismic survey data within said selected region of survey.

6. The method as defined by claim 5, comprising:

defining a minimal regional migration time/velocity function from a running average of the lower percentile delimiters of each said filtered histogram.

7. The method as defined by claim 6, comprising:

selecting a residual migration velocity function by sub-sampling the velocity from a desired portion of the respective filtered histograms embraced between the lower and upper percentile delimiters.

* * * * *